United States Patent

Desai

[11] 3,984,871
[45] Oct. 5, 1976

[54] TAPE CARTRIDGE RELEASE ASSEMBLY

[75] Inventor: Samir Thakorbhai Desai, Roselle, Ill.

[73] Assignee: Motorola, Inc., Schaumburg, Ill.

[22] Filed: Mar. 14, 1975

[21] Appl. No.: 558,519

[52] U.S. Cl. .................................. 360/93; 360/137
[51] Int. Cl.² ................. G11B 15/24; G11B 15/66; G11B 15/68
[58] Field of Search ............................. 360/93–96, 360/105, 137

[56] References Cited
UNITED STATES PATENTS

| | | | |
|---|---|---|---|
| 3,632,895 | 1/1972 | Ban | 360/93 |
| 3,711,657 | 1/1973 | Niioka | 360/93 |
| 3,747,940 | 7/1973 | Winkler | 360/93 |
| 3,759,530 | 9/1973 | Sampei | 360/93 |

Primary Examiner—Bernard Konick
Assistant Examiner—Jay P. Lucas
Attorney, Agent, or Firm—Margaret M. Parker; James W. Gillman

[57] ABSTRACT

An improved tape cartridge release assembly for a player/reproducer apparatus of the type used in a vehicle will automatically release a cartridge when the vehicle ignition switch is turned off, will release a cartridge inserted while the ignition switch is turned off, and will release manually as desired. The assembly utilizes a pair of switches operated by insertion of a cartridge to provide identical voltages to the input and common terminals of a semiconductor circuit controlling the release actuator. The semiconductor circuit, by remaining non-conductive, will prevent release until forward biasing voltage is provided to the controlled semiconductor device as by the ignition switch, the manual release button or other means.

8 Claims, 2 Drawing Figures

TAPE CARTRIDGE RELEASE ASSEMBLY

BACKGROUND OF THE INVENTION

1. Field of the Invention

This invention relates to the field of tape player/reproducers for use in a vehicle and to circuitry for the release of the tape cartridge used therein. More specifically, it relates to the prevention of deformation of the pressure roller of a cartridge caused by the cartridge remaining in playing position when power is removed from the capstan drive system. As is well known, such deformation can cause substantial deterioration in the quality of reproduction from the cartridge.

2. Prior Art

Tape players have used many different circuits which released or ejected a cartridge when the vehicle ignition switch was turned off but they did not solve the problem of releasing a cartridge inserted when the ignition switch was already turned off at the time the cartridge was inserted. Other approaches to the problem involved various elaborate mechanical devices for releasing a cartridge to prevent deformation of the pressure roller.

SUMMARY OF THE INVENTION

It is therefore an object of this invention to provide an improved cartridge release mechanism for magnetic tape player/reproducers of the type used in a vehicle.

It is a specific object of the invention to cause release of a cartridge from the mechanism if the ignition switch of the vehicle is turned off, if the ignition switch is already turned off when the cartridge is inserted, or if release is desired at any time.

It is a particular object of the invention to prevent deformation of the pressure roller caused by contact with the capstan when the capstan is not rotating.

A tape player/reproducer apparatus for use in a vehicle, which utilizes an exchangeable cartridge and has a capstan, a source of supply voltage, and a tape cartridge release assembly, includes mechanical actuating means for moving the cartridge away from the capstan and means for momentarily operating the mechanical actuating means in response to a predetermined signal. It also includes circuit means having at least one semiconductor device having an input terminal, an output terminal and a common terminal, the input terminal coupled to a source of reference voltage and to the supply voltage, the circuit means being adapted to provide the predetermined signal to the operating means when a voltage exists between the input terminal and the common terminal of the semiconductor device. First switch means, actuated by the insertion of a tape cartridge into the apparatus, is coupled to the supply voltage and the input terminal of the semiconductor device. A second switch means also actuated by the insertion of a tape cartridge is coupled between the supply voltage and the common terminal of the semiconductor device. A third switch means is in series connection with one of the first switch means for selectively interrupting the series connection between the respective terminal and the supply voltage. The input and common terminals of the semiconductor device normally have substantially identical voltages applied and interruption of the supply voltage to the input terminal of the device will allow conduction in the device, producing the predetermined signal.

DETAILED DESCRIPTION OF A PREFERRED EMBODIMENT

Figure 1:
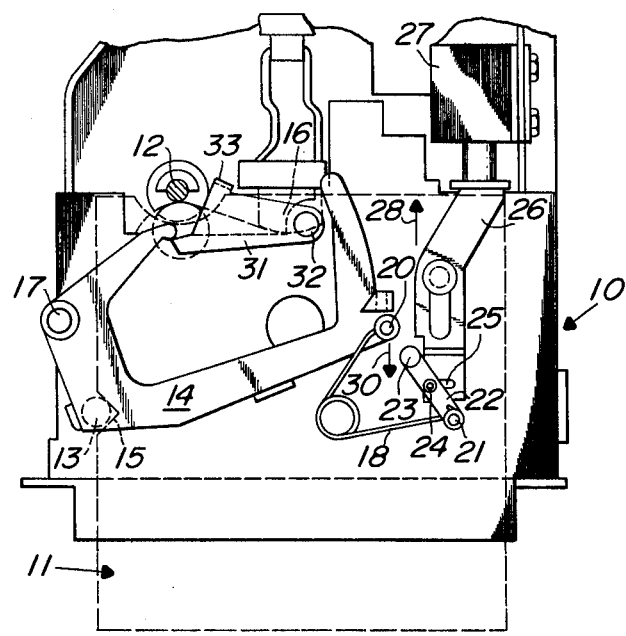
FIG. 1 is a partial cutaway view of a solenoid-operated tape cartridge release mechanism such as might be used with the present invention.

The instant invention might well be utilized with any one of a number of known eject or release mechanisms having a solenoid as device for converting information in electrical form into mechanical action for initiating ejection. The mechanism of FIG. 1 is more fully described in U.S. Pat. No. 3,485,500 issued Dec. 23, 1969 and assigned to the same assignee as the present invention. It is exemplary only in this application and is shown and described here only for the purpose of explaining more clearly the circuit according to the invention.

In FIG. 1 a tape player apparatus 10 for playing a tape cartridge 11 having a multi-track tape therein which is driven by a capstan 12. A locking roller 13 on an arm member 14 is moved into and out of a notch 15 in the cartridge to position and lock the cartridge against a transducer head 16 and capstan 12. The arm member 14 pivots about a pin 17 and an overcenter spring 18 pivots around a pin 20 on the arm member 14. The other end of the spring 18 pivots on a pin 21 on a linkage arm 22. The arm 22 pivots around a pin 23 fixedly mounted to the support structure of player 10 and is slideably and rotatably fastened by means of a pin 24 to a slot 25 in an armature 26 of a solenoid 27.

When the solenoid is energized, the armature 26 is pulled in the direction of an arrow 28. This action pulls and rotates the linkage arm 22 which forces the overcenter spring 18 to move from the stable position shown in FIG. 1 to a second stable position (not shown), pulling the pin 20 in the direction of an arrow 30. The ensuing clockwise rotation of arm member 14 about pin 17 moves the roller out of the notch 15, thereby unlocking the cartridge. As the arm 14 rotates it also engages a portion of an arm member 31 which pivots about a pin 32 mounted to the support structure of player 10. A projecting depending tab 33 on the arm 31 extends downwardly into the cartridge receiving area of the player apparatus and, when arm 31 rotates, in a counterclockwise direction as viewed in FIG. 1, the tab 33 moves the tape cartridge 11 away from the transducer 16 and capstan 12 and into a position where it can be grasped and removed easily with the operator's fingers. Insertion of a cartridge activates the mechanism in the reverse sequence, locking the cartridge into position and resetting the release mechanism.

Figure 2:
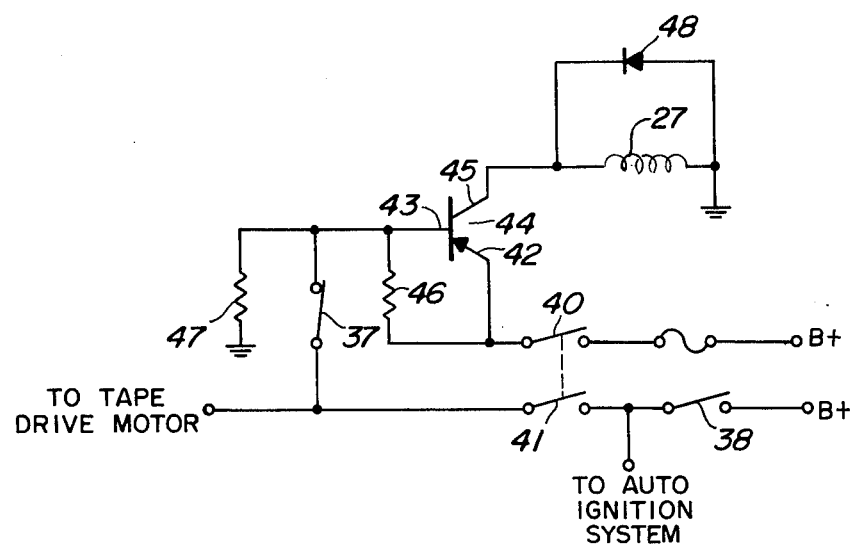
FIG. 2 is a schematic of the circuit according to the invention for actuating the release mechanism of FIG. 1.

Referring now to FIG. 2, the circuit shown would energize the solenoid 27, actuating the armature 26 to release the cartridge 11 when a manual release switch 37 is opened. The cartridge will be released automatically when an ignition switch 38 is opened and will also be released automatically if the ignition switch 38 is open when the cartridge is fully inserted into the player. This release function is achieved as follows: when the cartridge is fully inserted into the player, it closes two switches 40, 41. If at this time the ignition switch 38 is closed, i.e. "on", the B+ voltage will be applied through switch 40 to an emitter 42 and, through switch 41, to a base 43 of a transistor 44 and to the tape drive motor (not shown). In this preferred embodiment a PNP transistor device is shown, but it is clearly within the scope of the invention to utilize other semiconductor devices or combinations of devices. Thus, with substantially the same voltage on both base and emitter, the transistor 44 will not conduct and no current will flow from the collector 45 through the solenoid 27. If the ignition switch 38 is open, i.e. "off", at the time of cartridge insertion, B+ voltage would not be applied to the transistor base 43 but would be applied to the emitter 42. A reduced voltage would be applied to the base 43 by way of a biasing network made up of resistors 46 and 47, and the transistor 44 would conduct, causing current to flow through the solenoid 27, and activating the mechanism such as that of FIG. 1 to release a cartridge.

In like manner, if the ignition switch 38 is opened while a cartridge is locked in the player, the voltage on the base 43 of the transistor would drop, the transistor would be biased to conduction, current would flow through the transistor and the solenoid, as before, would activate the cartridge release mechanism.

If at any time the operator desires to release a cartridge, the manual release switch 37 can be actuated as by a pushbutton on the front panel (not shown). This, again, reduces the voltage on the transistor base, causes the transistor to conduct and current to flow through the solenoid. In all cases, when a cartridge is released, voltage to the tape drive motor is removed also by any means known in the art. A diode 48 is coupled across the solenoid with reverse polarity to provide a protective shunt bypass for the energy which is stored in the coil while the coil is energized. It should be noted that other switches could be inserted in the circuit leading from the B+ supply through the switch 41, such as an on-off switch on the front panel, which would turn off the tape player and release the inserted cartridge.

I claim:

1. A tape player-reproducer apparatus for use in a vehicle, the apparatus utilizing an exchangeable cartridge and having a capstan, a source of supply voltage, and a tape cartridge release assembly, the release assembly comprising:

mechanical actuating means for moving the cartridge away from the capstan;

solenoid means for activating the mechanical actuating means;

transistor circuit means having at least a transistor, an input terminal, an output terminal and a common terminal, the input terminal being coupled to a source of reference voltage, to the base of the transistor and to the supply voltage, the output terminal coupled to the collector of the transistor, the common terminal coupled to the emitter of the transistor and to the supply voltage, and wherein the transistor means is adapted to conduct and thereby energize the solenoid means when a forward biasing difference voltage exists between the input terminal and the common terminal of the transistor means;

first and second switch means actuated only by the insertion of a tape cartridge into the apparatus and coupled to the supply voltage and to the transistor means for applying to the input and common terminals substantially identical voltages;

third switch means in series connection with the first switch means for selectively interrupting the series connection between the input terminal and the supply voltage; and wherein interruption of the supply voltage to the input terminal of the transistor means will allow conduction in the transistor.

2. A release assembly according to claim 1 and further including the first and second switches being operated simultaneously to close the series connection to the supply voltage to apply identical voltages to the input and common terminals when a cartridge is received in the apparatus and otherwise said switches being open, and interrupting the series connection to the supply voltage.

3. The tape player/reproducer apparatus according to claim 1 wherein the third switch is an ignition switch of an internal combustion engine in the vehicle.

4. The tape player/reproducer apparatus of claim 1 and further including a manual release switch in series with the first switch means for interruption of the series connection.

5. The tape player/reproducer apparatus according to claim 1 and further including an on-off switch in series connection with the first switch means for interruption of the series connection.

6. In a tape player/reproducer apparatus for use in a vehicle, the system utilizing an exchangeable cartridge and having a capstan, a source of supply voltage, and a tape cartridge release assembly, the release assembly comprising:

a mechanical actuating means for moving the cartridge away from the capstan;

a solenoid means for activating the mechanical actuating means;

transistor means having at least a transistor, an input terminal, an output terminal and a common terminal, the input terminal being coupled to a source of reference voltage, to the base of the transistor, and to the supply voltage, the output terminal coupled to the collector of the transistor, the common terminal coupled to the emitter of the transistor and to the supply voltage, the transistor means being adapted to energize the solenoid means when a difference voltage exists between the input terminal and the common terminal of the transistor means, thus providing forward biasing for the transistor means;

a first switch means positioned for being closed by the insertion of a tape cartridge into the apparatus and having a first terminal coupled to the supply voltage through the ignition switch of the vehicle and a second terminal coupled to the input terminal of the transistor means; and a second switch means positioned for being closed simultaneously with the first switch by the insertion of a tape cartridge into the apparatus and being connected in a series circuit including the source of supply voltage, the common and output terminals of the transistor means and the coil of the solenoid means.

7. A tape player/reproducer apparatus for use in a vehicle, the apparatus utilizing an exchangeable cartridge and having a capstan, a source of supply voltage, and a tape cartridge release assembly, the release assembly comprising:

mechanical actuating means for moving the cartridge away from the capstan;

means for momentarily operating the mechanical actuating means in response to a predetermined signal;

circuit means having at least one semiconductor device, said device having an input terminal, an output terminal and a common terminal, the input terminal coupled to a source of reference voltage and to the supply voltage, and wherein the circuit means is adapted to provide the predetermined signal to the operating means when a voltage exists between the input terminal and the common terminal of the semiconductor device;

first switch means actuated by the insertion of a tape cartridge into the apparatus and coupled between the supply voltage and the input terminal of the semiconductor device;

second switch means actuated by the insertion of a tape cartridge into the apparatus and coupled between the supply voltage and the common terminal of the semiconductor device;

third switch means in series connection with one of the first and second switch means for selectively interrupting the series connection between the respective terminal and the supply voltage, and whereby the input and common terminals of the semiconductor device normally have substantially identical voltages applied and interruption of the supply voltage to the input terminal of the device will allow conduction in the device, producing the predetermined signal.

8. A tape player/reproducer apparatus for use in a vehicle, the apparatus utilizing an exchangeable cartridge and having a capstan, a source of supply voltage, and a tape cartridge release assembly, the release assembly comprising:

mechanical actuating means for moving the cartridge away from the capstan;

means for momentarily operating the mechanical actuating means in response to a predetermined signal;

circuit means having at least one semiconductor device, said device having an input terminal, an output terminal and a common terminal, and wherein the circuit means is adapted to provide the predetermined signal to the operating means when a voltage exists between the input terminal and the common terminal of the semiconductor device;

first and second switch means actuated only by the insertion of a tape cartridge into the apparatus and coupled to the supply voltage and to the semiconductor device for applying to the input and common terminals respectively substantially identical voltages;

resistor means coupled between the input and common terminals, third switch means normally coupled to short the resistor means and adapted to unshort the resistor means when the third switch means is operated, and whereby a voltage is produced between the input and common terminals of the semiconductor device to provide the predetermined signal to the operating means.

* * * * *